United States Patent
Knuth

(10) Patent No.: US 7,303,034 B1
(45) Date of Patent: Dec. 4, 2007

(54) REMOVABLE COOLING FAN KIT FOR A MOTORCYCLE ENGINE

(76) Inventor: Dale E. Knuth, 2945 S. 46th St., Milwaukee, WI (US) 53219

(*) Notice: Subject to any disclaimer, the term of this patent is extended or adjusted under 35 U.S.C. 154(b) by 174 days.

(21) Appl. No.: 11/217,809

(22) Filed: Sep. 1, 2005

Related U.S. Application Data

(63) Continuation-in-part of application No. 10/915,054, filed on Aug. 10, 2004, now abandoned.

(51) Int. Cl.
*B60K 11/00* (2006.01)
(52) U.S. Cl. .................... 180/68.1; 180/68.2
(58) Field of Classification Search ............. 180/11, 180/229, 219, 226, 68.1, 68.2; 165/214, 165/125, 149, 122; 123/198 E, 41.51
See application file for complete search history.

(56) References Cited

U.S. PATENT DOCUMENTS

| | | | | |
|---|---|---|---|---|
| 4,531,928 A | * | 7/1985 | Ikenoya ................... | 180/229 |
| 4,564,081 A | * | 1/1986 | Hamane et al. ........... | 180/229 |
| 4,687,069 A | * | 8/1987 | Inomata et al. ........... | 180/68.2 |
| 4,697,665 A | * | 10/1987 | Eastman et al. ........... | 180/229 |
| 4,703,825 A | * | 11/1987 | Mikami et al. ............ | 180/229 |
| 4,770,262 A | * | 9/1988 | Yasunaga et al. ......... | 180/68.1 |
| 5,167,209 A | * | 12/1992 | Dufern et al. ............. | 123/198 E |
| 5,176,111 A | * | 1/1993 | Nakamura et al. ........ | 180/229 |
| 5,715,778 A | * | 2/1998 | Hasumi et al. ........... | 123/41.51 |
| 5,992,554 A | * | 11/1999 | Hasumi et al. ............ | 180/229 |
| 6,209,627 B1 | * | 4/2001 | Hasumi ..................... | 165/122 |
| 6,508,326 B2 | * | 1/2003 | Kido et al. ................ | 180/226 |
| 6,601,667 B2 | | 8/2003 | Buell et al. ............... | 180/229 |

OTHER PUBLICATIONS

A Print out From the Harley-Davidson Website, (1) Page.

* cited by examiner

*Primary Examiner*—Hau Phan
(74) *Attorney, Agent, or Firm*—Donald J. Ersler

(57) ABSTRACT

A removable cooling fan kit for a motorcycle includes a base plate, at least one fan and an on-off switch. The base plate is secured adjacent the cylinder heads of the motorcycle engine. Each fan is positioned and attached to the base plate such that a stream of air from the fan blows past a side of the cylinder head. An opening is formed through the base plate, adjacent each fan to allow air to be drawn by each fan. Preferably, an on-off switch controls power to the at least one fan. The at least one fan is powered by the battery of the motorcycle.

18 Claims, 4 Drawing Sheets

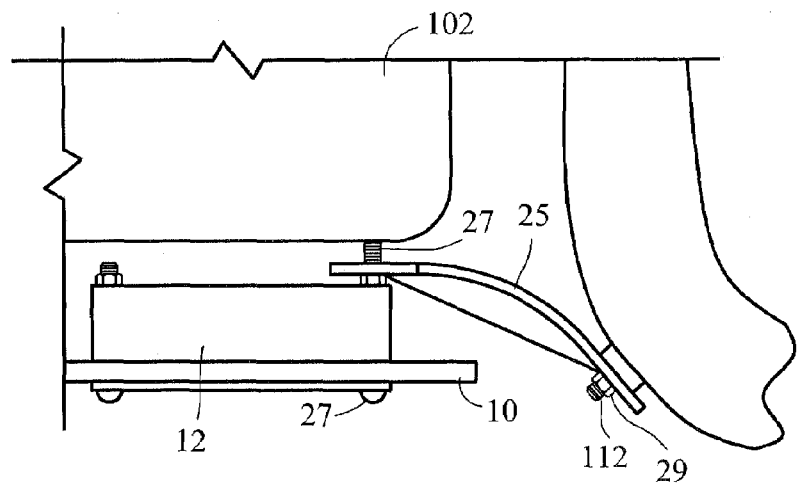
FIG. 2A
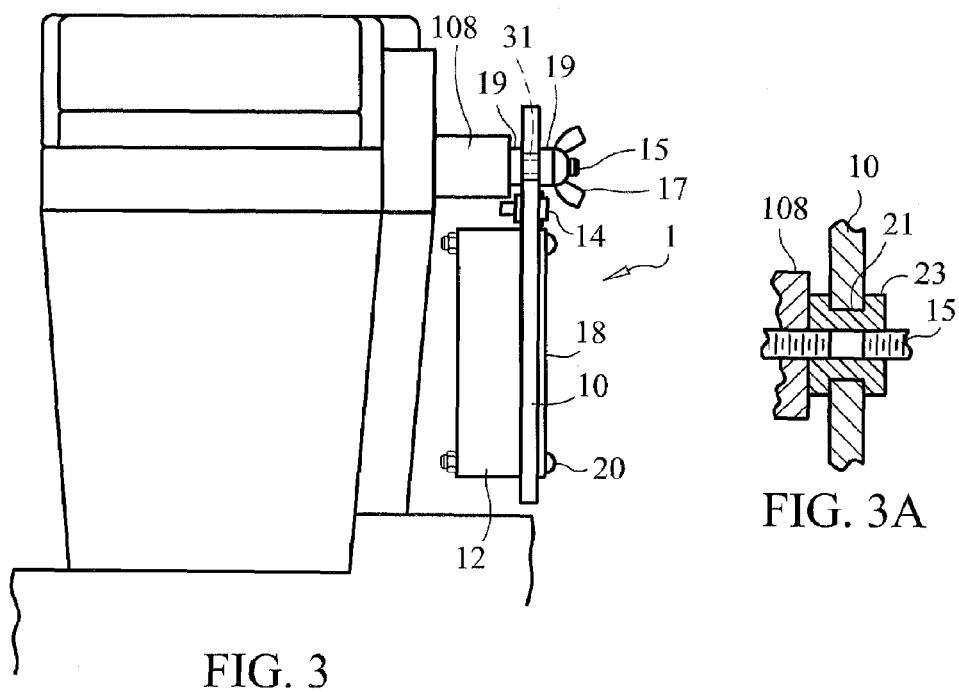
FIG. 3
FIG. 3A

REMOVABLE COOLING FAN KIT FOR A MOTORCYCLE ENGINE

CROSS-REFERENCES TO RELATED APPLICATIONS

This is a continuation-in-part patent application taking priority from nonprovisional application Ser. No. 10/915,054 filed on Aug. 10, 2004 now abandoned.

BACKGROUND OF THE INVENTION

1. Field of the Invention

The present invention relates generally to engine cooling and more specially to a removable cooling fan kit for a motorcycle engine, which allows the motorcycle to be ridden in a parade or at low speed without over heating.

2. Discussion of the Prior Art

It appears that no removable cooling fan kit is available for larger displacement motorcycle engines. Many motorcycles with larger displacement air-cooled engines are prone to overheating when in a parade or in stop-and-go driving on a crowded freeway. Over heating can damage a motorcycle engine and can be an inconvenience for the rider, when they have to stop to let the engine cool. U.S. Pat. No. 6,601,667 to Buell et al. discloses a motorcycle engine cooling system. The Buell et al. patent includes a motorcycle with an engine cooling fan that creates a flow of cooling air across the engine. The '667 discloses a cooling fan that is permanently retained by the motorcycle.

Accordingly, there is a clearly felt need in the art for a removable cooling fan kit for a motorcycle engine, which may be easily attached and removed from a motorcycle engine for blowing air over the cylinder heads thereof.

SUMMARY OF THE INVENTION

The present invention provides a removable cooling fan kit for a motorcycle engine, which allows the motorcycle to be ridden at low speed without over heating. The removable cooling fan kit for a motorcycle (removable cooling fan kit) includes a base plate, at least one fan and an on-off switch. The base plate is secured to the motorcycle adjacent the cylinder heads of the motorcycle engine with at least one quickly removable device. The at least one fan is positioned and attached to the base plate such that a stream of air from the fan blows past a side of the cylinder head. An opening is formed through the base plate, adjacent each fan to allow air to be drawn by each fan. Each fan is preferably attached to the base plate with fasteners, but other attachment methods may also be used. Preferably, a first end of a support bracket is retained by the base plate and a second end is attached to an exhaust clamp, adjacent a cylinder head. A power and ground wire is connected to each fan. Preferably, an on-off switch controls power to the at least one fan. The at least one fan is powered by the battery of the motorcycle. A thermostat may be used to control power supplied to the at least one fan instead of the on-off switch.

Accordingly, it is an object of the present invention to provide a removable cooling fan kit, which may be easily attached and removed from a motorcycle for blowing air over the cylinder heads thereof.

These and additional objects, advantages, features and benefits of the present invention will become apparent from the following specification.

BRIEF DESCRIPTION OF THE DRAWINGS

FIG. 2a is a top view of a support bracket of a removable cooling fan kit in accordance with the present invention.

FIG. 3 is an end view of a removable cooling fan kit secured to a motorcycle in accordance with the present invention.

FIG. 3a is an enlarged cross sectional view of a one piece grommet retained in a base plate of a removable cooling fan kit in accordance with the present invention.

DETAILED DESCRIPTION OF THE PREFERRED EMBODIMENTS

Figure 1:
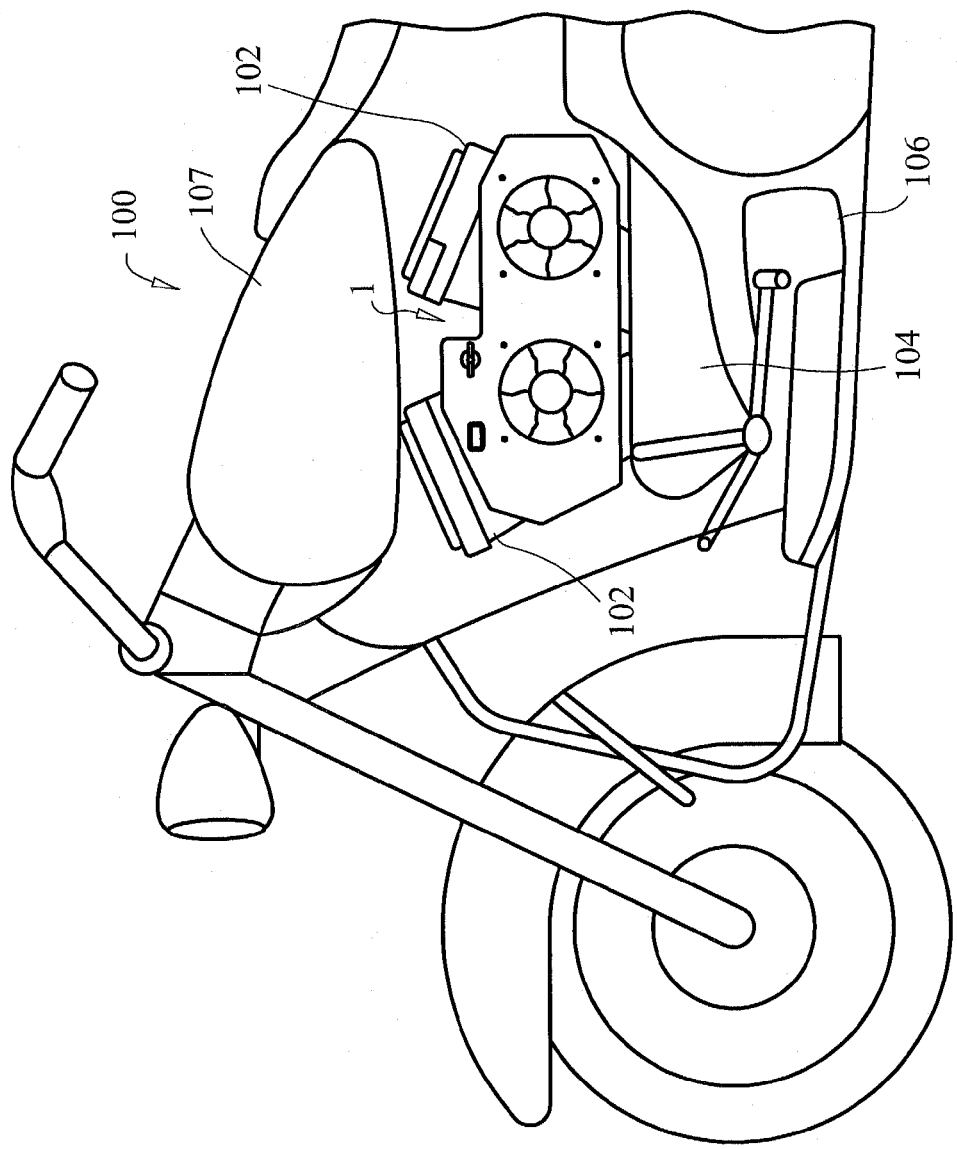
FIG. 1 is a partial side view of a motorcycle with an removable cooling fan kit secured thereto in accordance with the present invention.
Figure 2:
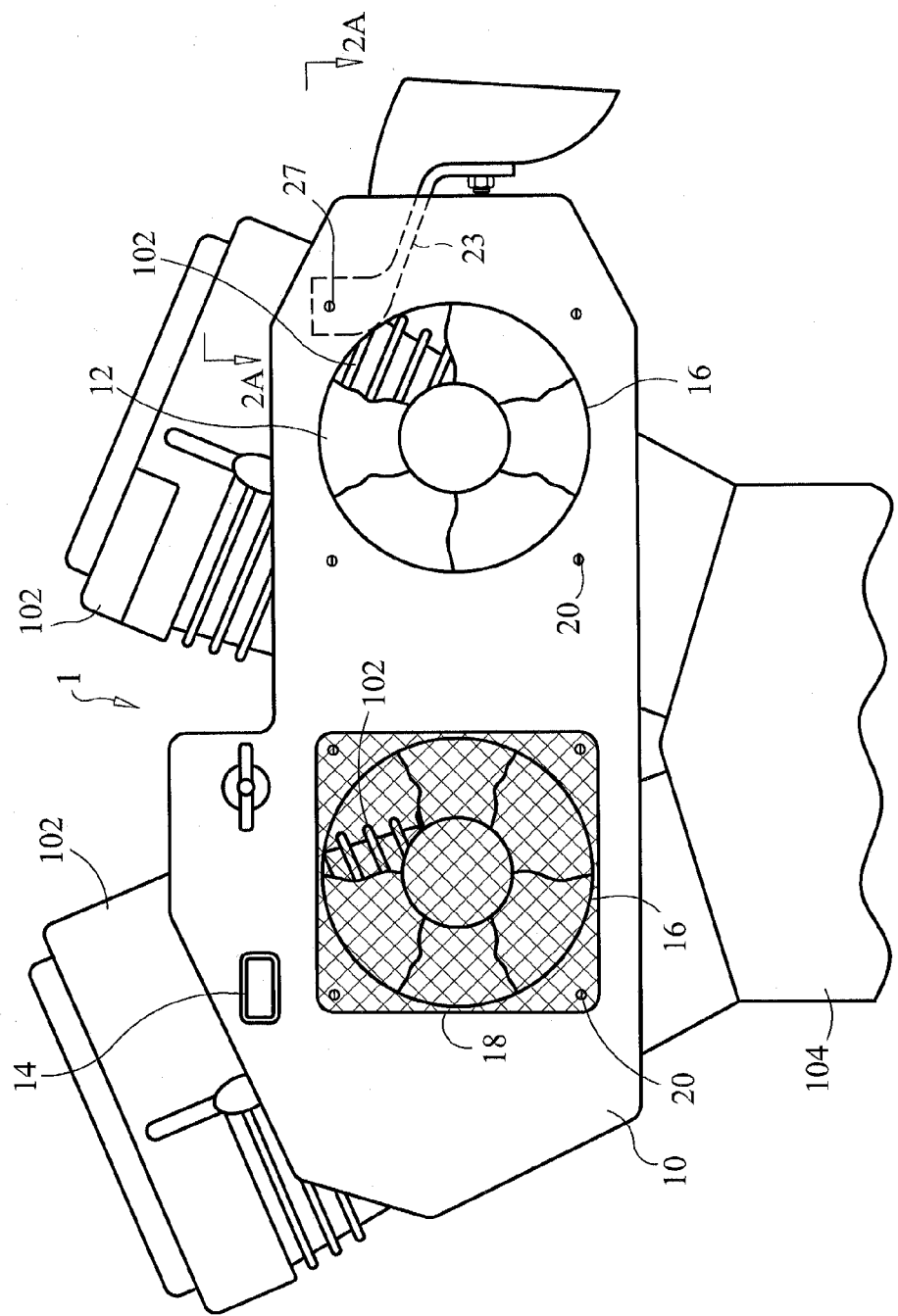
FIG. 2 is a front view of a removable cooling fan kit secured to a motorcycle in accordance with the present invention.
Figure 4:
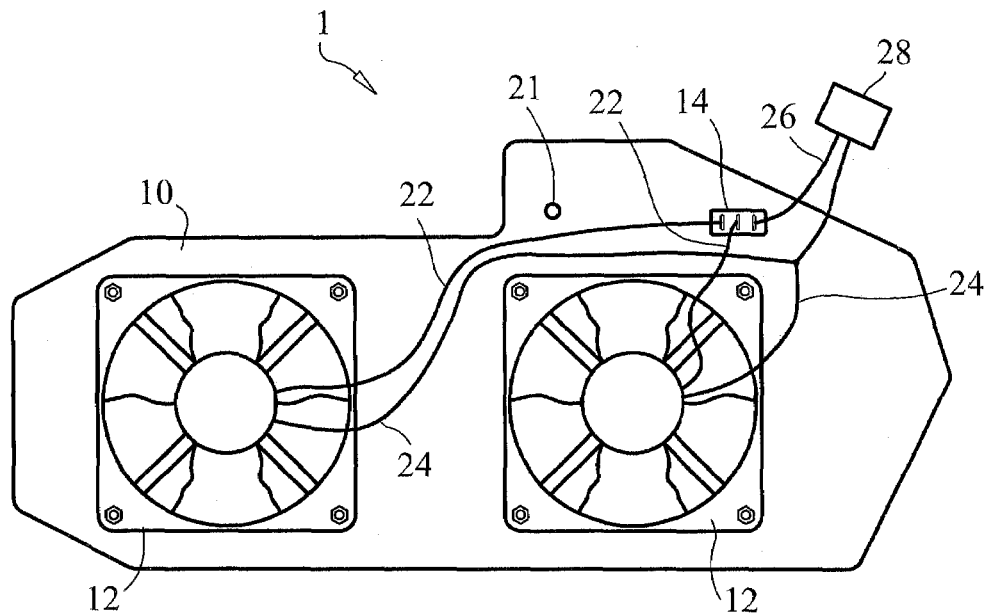
FIG. 4 is a rear view of a removable cooling fan kit in accordance with the present invention.

With reference now to the drawings, and particularly to FIG. 1, there is shown a side view of a motorcycle 100 with a removable cooling fan kit 1 secured thereto. The removable cooling fan kit 1 acts as an accessory to the motorcycle 100, because it is attached to the motorcycle 100 when an air cooled engine 104 of the motorcycle 100 needs extra cooling. When the motorcycle engine 104 no longer needs extra cooling, the removable cooling fan kit 1 is removed.

With reference to FIGS. 2-5, the removable cooling fan kit 1 includes a base plate 10, at least one fan 12 and an on-off switch 14. One end of the base plate 10 is secured adjacent cylinder heads 102 of the motorcycle engine 104 with some type of fastener, such as a stud 15 extending from an engine 104, a motorcycle frame 106, a gas tank 107 or any other suitable structure and a wing nut 17 or any other quickly removable device. A quickly removable device is defined as a fastener that is secured or removed without the aid of a hand tool, such as a wrench or a screw driver, or a power tool, such as a pneumatic torque driver or an electric torque driver. The quickly removable device is secured or removed with fingers of a user. The stud 15 is inserted through a fastener hole 21. The wing nut 17 is a quickly removable device because it is tightened loosened with fingers.

A resilient grommet 19 is preferably inserted between the wing nut 17 and the base plate 10. A second resilient grommet 19 is also inserted between the base plate 10 and an attachment boss 108. The resilient grommets 19 damp vibration to the removable cooling fan 1 from the motorcycle frame 100. It is preferable to use a stud bushing 31, when using the two resilient grommets 19. The stud bushing 31 is inserted or pressed into the fastener hole 21 and the stud 15 is inserted into the stud bushing 31. The stud bushing 31 absorbs impact between the stud 15 and the base plate 10. The resilient grommet 19 and the stud bushing 31 are preferably fabricated from rubber, but other materials may also be used. With reference to FIG. 3a, a one piece resilient grommet 23 is retained in the fastener hole 21. The one piece grommet 23 replaces the two resilient grommets 19 and stud bushing 31. The one piece grommet 23 is preferably fabricated from rubber.

Each fan 12 is positioned and attached to the base plate 10, such that a stream of air from the fan 12 blows past a side of the cylinder head 102. Each fan 12 is preferably a high velocity feather fan (commonly used in computer applications), but other types of fans may also be used. Each fan 12 is preferably waterproof, but at least water resistant. The fan 12 is preferably powered by 12 volts DC to allow a motorcycle 12 volt battery 110 to power thereof. An opening 16 is formed through the base plate 10, adjacent each fan 12 to allow air to be drawn. The opening 16 is preferably covered with a screen 18 to prevent injury to a rider or damage to each fan 12. Each fan 12 and screen 18 (if used) is preferably attached to the base plate 10 with fasteners 20, but other attachment methods may also be used.

The base plate 10 may be fabricated from a clear or translucent plastic and illuminated with some type of lighting device. Each fan 12 may be of the type that emits light. A support bracket 25 preferably supports the other end of the base plate 10. A first end of the support bracket 25 preferably includes a fastener hole. An extended fastener 27 extending from one of the fans 12 or the base plate 10 is inserted through the fastener hole in the first end of the support bracket 25. The other end of the base plate 10 is preferably retained by the support bracket 25 and the extended fastener 27, but other methods of retaining the other end of the base plate 10 may also be used. A second end of the support bracket 25 is attached to an exhaust muffler clamp stud 112 with a nut 29 or the like.

Figure 5:
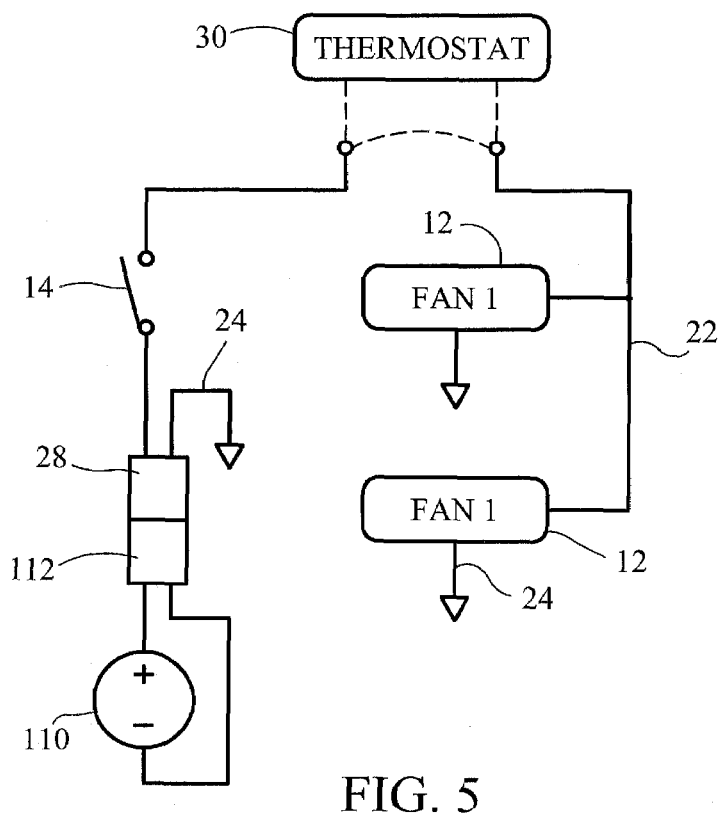
FIG. 5 is an electrical schematic of a removable cooling fan kit in accordance with the present invention.

With reference to FIG. 5, a power wire 22 is connected to each fan 12 and the on-off switch 14. However, the on-off switch 14 could be eliminated, if an auxiliary connector 112 provided power only when the motorcycle ignition is on. The on-off switch is preferably of the type that emits light when in the "on" position. A ground wire 24 is also connected to each fan 12. The ground wires 24 and a switch wire 26 are preferably retained in an electrical connector 28. The electrical connector 28 is preferably the same type as would mate with the auxiliary power connector 112 extending from the electrical system of a motorcycle. The on-off switch 14 controls power to the at least one fan 12. The battery 110 is shown connected to the auxiliary connector 112. A thermostat 30 may be included to sense when the at least one fan 12 should be activated. The thermostat 30 will close a circuit to supply power when temperature near the thermostat 30 exceeds a particular number. Thermostats are well known in the art and need not be explained in detail.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of providing air cooling to an engine of a motorcycle with a removable cooling fan kit, comprising the steps of:
   providing said removable fan kit with a base plate, retaining at least one fan on said base plate;
   providing means for mounting said base plate to the motorcycle;
   securing said base plate to said means for mounting with at least one quickly removable device, said at least one removable device being able to be completely tightened, secured and removed by a hand without the need for a hand tool or a power tool; and
   locating said at least one fan on said base plate.

2. The method of providing air cooling to an engine of a motorcycle with a removable cooling fan kit of claim 1, further comprising the step of:
   forming an opening through said base plate adjacent each one of said at least one fan.

3. The method of providing air cooling to an engine of a motorcycle with a removable cooling fan kit of claim 2, further comprising the step of:
   attaching a screen in front of said opening.

4. The method of providing air cooling to an engine of a motorcycle with a removable cooling fan kit of claim 1, further comprising the step of:
   providing an on-off switch for selectively providing power to said at least one fan.

5. The method of providing air cooling to an engine of a motorcycle with a removable cooling fan kit of claim 1, further comprising the step of:
   providing a thermostat for said means for selectively providing power to said at least one fan.

6. The method of providing air cooling to an engine of a motorcycle with a removable cooling fan kit of claim 1, further comprising the step of:
   providing at least one high velocity feather fan for said at least one fan.

7. The method of providing air cooling to an engine of a motorcycle with a removable cooling fan kit of claim 1, further comprising the step of:
   providing said means for mounting with a support bracket, retaining said base plate with one end of said support bracket, attaching the other end of said support bracket to some portion of the motorcycle.

8. The method of providing air cooling to an engine of a motorcycle with a removable cooling fan kit of claim 1, further comprising the step of:
   locating said at least one fan such that air blows across at least one side of a cylinder head of the engine.

9. A method of providing air cooling to an engine of a motorcycle with a removable cooling fan kit, comprising the steps of:
   providing said removable fan kit with a base, plate;
   providing means for mounting said base plate to the motorcycle;
   retaining at least one fan on said base plate, forming an opening through said base plate adjacent each one of said at least one fan;
   securing said base plate to said means for mounting with at least one quickly removable device, said at least one removable device being able to be completely tightened, secured and removed by a hand without the need for a hand tool or a power tool; and
   locating said at least one fan on said base plate, such that said at least one fan blows air across at least one side of a cylinder head of the engine.

10. The method of providing air cooling to an engine of a motorcycle with a removable cooling fan kit of claim 9, further comprising the step of:
    removing said base plate from the motorcycle when extra cooling is not required.

11. The method of providing air cooling to an engine of a motorcycle with a removable cooling fan kit of claim 9, further comprising the step of:
    attaching a screen in front of said opening.

12. The method of providing air cooling to an engine of a motorcycle with a removable cooling fan kit of claim 9, further comprising the step of:
    providing an on-off switch for selectively providing power to said at least one fan.

13. The method of providing air cooling to an engine of a motorcycle with a removable cooling fan kit of claim 9, further comprising the step of:
   providing a thermostat for said means for selectively providing power to said at least one fan.

14. The method of providing air cooling to an engine of a motorcycle with a removable cooling fan kit of claim 9, further comprising the step of:
   providing at least one high velocity feather fan for said at least one fan.

15. The method of providing air cooling to an engine of a motorcycle with a removable cooling fan kit of claim 9, further comprising the step of:
   providing said means for mounting with a support bracket, retaining said base plate with one end of said support bracket, attaching the other end of said support bracket to some portion of the motorcycle.

16. A method of providing air cooling to an engine of a motorcycle with a removable cooling fan kit, comprising the steps of:
   providing said removable fan kit with a base plate;
   providing means for mounting said base plate to the motorcycle;
   retaining at least one fan on said base plate, forming an opening through said base plate adjacent each one of said at least one fan;
   securing said base plate to said means for mounting with at least one quickly removable device, said at least one quickly removable device being able to be completely tightened, secured and removed by a hand without the need for a hand tool or a power tool;
   locating said at least one fan on said base plate, such that said at least one fan blows air across at least one side of a cylinder head of the engine; and
   removing said base plate from the motorcycle when extra cooling is not required.

17. The method of providing air cooling to an engine of a motorcycle with a removable cooling fan kit of claim 16, further comprising the step of:
   providing at least one high velocity feather fan for said at least one fan.

18. The method of providing air cooling to an engine of a motorcycle with a removable cooling fan kit of claim 16, further comprising the step of:
   providing said means for mounting with a support bracket, retaining said base plate with one end of said support bracket, attaching the other end of said support bracket to some portion of the motorcycle.

* * * * *